United States Patent
Malrait et al.

(10) Patent No.: US 9,912,273 B2
(45) Date of Patent: Mar. 6, 2018

(54) METHOD FOR CONTROLLING AN ASYNCHRONOUS ELECTRICAL MOTOR

(71) Applicant: Schneider Toshiba Inverter Europe SAS, Pacy sur Eure (FR)

(72) Inventors: Francois Malrait, Jouy sur Eure (FR); Al Kassem Jebai, Vernon (FR); Thomas Devos, Carrieres sous Poissy (FR)

(73) Assignee: SCHNEIDER TOSHIBA INVERTER EUROPE SAS, Pacy sur Eure (FR)

( * ) Notice: Subject to any disclaimer, the term of this patent is extended or adjusted under 35 U.S.C. 154(b) by 0 days.

(21) Appl. No.: 15/451,826

(22) Filed: Mar. 7, 2017

(65) Prior Publication Data

US 2017/0288587 A1    Oct. 5, 2017

(30) Foreign Application Priority Data

Apr. 5, 2016 (FR) ..................... 16 52955

(51) Int. Cl.
*H02P 21/00* (2016.01)
*H02P 21/14* (2016.01)
*H02P 27/08* (2006.01)

(52) U.S. Cl.
CPC ............ *H02P 21/141* (2013.01); *H02P 27/08* (2013.01)

(58) Field of Classification Search
CPC ...... H02P 1/00; H02P 1/04; H02P 1/16; H02P 1/18; H02P 1/24; H02P 1/26; H02P 1/28; H02P 21/00; H02P 21/04; H02P 21/06; H02P 21/08; H02P 21/10; H02P 21/12; H02P 21/13; H02P 21/14; H02P 23/00; H02P 23/03; H02P 5/00; H02P 6/00; H02P 6/04; H02P 6/06; H02P 6/08
(Continued)

(56) References Cited

U.S. PATENT DOCUMENTS 5,204,607 A * 4/1993 Hugel .................... H02P 21/06
                                                              318/806
7,221,117 B2    5/2007 Jadot et al.
(Continued)

FOREIGN PATENT DOCUMENTS

EP    2 804 310 A1    11/2014

OTHER PUBLICATIONS

U.S. Appl. No. 15/176,735, filed Jun. 8, 2016, 2017/0005597 A1, Al Kassem Jebai et al.
(Continued)

*Primary Examiner* — Antony M Paul
(74) *Attorney, Agent, or Firm* — Oblon, McClelland, Maier & Neustadt, L.L.P.

(57) ABSTRACT

A method for controlling an asynchronous electrical motor, implemented in a processing unit associated with a power converter connected to the electrical motor, the method including an identification phase, which includes generating a speed trajectory in input of a control law of the motor in order to make the speed reference take several determined successive values, for each value taken by the speed reference, determining the voltage at the terminals of the electrical motor, for each value taken by the speed reference, determining and storing the flux value for which the voltage at the terminals of the electrical motor is equal to a determined threshold value.

12 Claims, 4 Drawing Sheets

(58) Field of Classification Search
USPC ......... 318/121, 400.02, 400.14, 400.12, 721,
318/799, 400.01, 801, 700, 701; 322/50;
361/5, 6, 7, 30, 33, 86, 90, 93.9, 143;
363/23, 28, 34, 40, 44, 55, 56.05, 56.11,
363/175
See application file for complete search history.

(56) References Cited

U.S. PATENT DOCUMENTS

| | | |
|---|---|---|
| 9,197,152 B2 | 11/2015 | Jebai et al. |
| 2006/0208689 A1 | 9/2006 | Jadot et al. |
| 2012/0068639 A1 | 3/2012 | Sejimo |

OTHER PUBLICATIONS

U.S. Appl. No. 15/275,927, filed Sep. 26, 2016, Al Kassem Jebai et al.
French Preliminary Search Report dated Dec. 7, 2016 in French Application 16 52955, filed on Apr. 5, 2016 ( with English Translation of Categories of Cited Document s and Written Opinion).

* cited by examiner

METHOD FOR CONTROLLING AN ASYNCHRONOUS ELECTRICAL MOTOR

TECHNICAL DOMAIN OF THE INVENTION

This invention relates to a method for controlling an electrical motor of the asynchronous type and to a control system for implementing said method for controlling said electrical motor.

PRIOR ART

In a conventional control scheme of an electrical motor of the asynchronous type, a control law is executed by a processing unit and receives in input a speed reference (or pulsation reference) and a flux reference. As a function of these two items of information and of measurements of values on the motor (current and/or speed), the processing unit determines a voltage reference to be applied to the electrical motor. From this voltage reference, the processing unit determines the control voltages to be applied to each output phase connected to the motor. In a known manner, these voltages are applied to the motor using an electronic power architecture.

As a general rule, this architecture is connected to an electrical network supplying an alternating electrical voltage. The architecture includes an AC/DC rectifier, a DC power supply bus connected to the rectifier and a voltage inverter of the DC/AC type. The voltage inverter is controlled, for example, in Pulse Width Modulation. Such an inverter delivers to the motor a sequence of pulses of fixed amplitude, positive or negative and modulated in width, according to a voltage control law.

The maximum voltage delivered to the electrical motor cannot exceed the voltage available at the DC power supply bus.

In this control scheme, it is known that when a speed reference greater than a certain threshold (generally near the rated speed of the motor) and a constant flux reference are imposed in input, the voltage calculated as a function of these references can be incompatible with the voltage available on the network or with a limitation of voltage chosen for the motor to be powered. In such a situation, in order to be able to apply this speed reference to the electrical motor and thus to obtain a voltage that the inverter can generate, the processing unit must of necessity reduce the flux value and thus enter into a "flux reduction" zone.

An approach to this problem was first made in U.S. Pat. No. 5,204,607, which proposes to correct the flux reference when the determined voltage reference becomes greater than the voltage that the inverter can supply. For this purpose, the system makes a comparison between the voltage reference and the maximum voltage that the inverter can supply. The calculated difference is used to determine a correction value to be applied to the flux reference. The flux reference is corrected as long as the voltage reference for the inverter is less than or equal to the maximum voltage that the inverter can supply. The flux reference and the real flux are therefore always in agreement, which prevents any flux reduction. However, in this system, the current references are not corrected dynamically, and it cannot therefore be guaranteed the same stability properties within the voltage limitation zone and outside this zone.

U.S. Pat. No. 7,221,117 proposes another solution that uses a model of the electrical motor and that makes it possible to adjust the flux in voltage limitation and hence to ensure stability of the control of the electrical motor in voltage limitation. However, in this latter method, the fact of reaching the voltage limitation during flux reduction causes transient dynamic disturbances of the mechanical values of the electrical motor and in particular of the torque of the electrical motor.

The aim of the invention is therefore to propose a control method implemented in the processing unit that makes it possible to resolve the problems of dynamic disturbances linked with the passage into the "flux reduction" region.

DESCRIPTION OF THE INVENTION

This aim is achieved by a method for controlling an asynchronous electrical motor, implemented in a processing unit, said processing unit being associated with a power converter connected by output phases to said electrical motor and disposed to execute a control law for the purpose of determining the voltages to be applied to said electrical motor based on a speed reference and a flux reference applied in input, said method including an identification phase, which consists in:
  Generating a speed trajectory in input of the control law in order to make the speed reference take several determined successive values,
  For each value taken by the speed reference, determining the voltage at the terminals of the electrical motor,
  For each value taken by the speed reference, determining and storing the flux value for which the voltage at the terminals of the electrical motor is equal to a determined threshold value.

According to a particularity, the speed trajectory follows a profile as a staircase, each step of which corresponds to a distinct value to be applied. According to a first embodiment, for each value taken by the speed reference, the method consists in:
  Making the flux reference vary between a minimum value and a maximum value,
  Determining the curve of variation of the motor voltage obtained when the flux reference varies,
  Determining the flux reference value for which the motor voltage is equal to said threshold value.

In this first embodiment, the method consists in determining the intersection between the constant formed by said threshold value and the curve of variation of the motor voltage obtained when the flux reference varies at a given speed reference.

According to a second embodiment, for each value taken by the speed reference, it consists in:
  Fixing the flux reference at a determined value,
  Determining the motor voltage obtained as a function of said speed reference value and said flux reference, both applied in input,
  Determining the voltage difference between the motor voltage obtained and said threshold value,
  Correcting the flux reference value applied in input until the motor voltage is equal to said threshold value,
  Storing the flux reference value obtained when the motor voltage is equal to said threshold value.

According to another particularity of the invention, the method includes an operating phase that follows the identification phase and in which each flux value stored in conjunction with each speed reference during the identification phase can be used to adjust the flux in real time when the control law of the electrical motor is executed.

The invention also relates to a control system for an electrical motor comprising a processing unit, said processing unit being associated with a power converter connected by output phases to said electrical motor and disposed to apply variable voltages to said electrical motor while executing a control law, said system, during an identification phase, executes:

A module for generating a speed trajectory in input of the control law so as to make the speed reference take several determined successive values, For each value taken by the speed reference, a module for determining the voltage at the terminals of the electrical motor, For each value taken by the speed reference, a module for determining the flux value for which the voltage at the terminals of the electrical motor is equal to a determined threshold value, and a module for storing said determined flux value.

According to a particularity of the system, the speed trajectory generated by the module for generating a trajectory follows a profile as a staircase, each step of which corresponds to a distinct value to be applied.

According to a first embodiment, for each value taken by the speed reference, the system executes:

A module for generating a flux reference trajectory between a minimum value and a maximum value, A module for determining a curve of variation of the motor voltage when the flux reference varies, A module for determining the flux reference value for which the motor voltage is equal to said threshold value.

According to a particularity of this first embodiment, said module for determining the flux reference value is disposed to determine the intersection between the constant formed by said threshold value and the curve of variation of the motor voltage obtained when the flux reference varies at a given speed reference.

According to a second embodiment, for each value taken by the speed reference, the system fixes the flux reference at a determined value and executes:

A module for determining the motor voltage obtained as a function of said speed reference value and said flux reference value, both applied in input, A module for determining the voltage difference between the motor voltage obtained and said threshold value, A module for determining a correction to be applied to the flux reference value applied in input until the motor voltage is equal to said threshold value, A module for storing the flux reference value obtained when the motor voltage is equal to said threshold value.

According to a particularity, during an operating phase that follows the identification phase, it is disposed to adjust the flux in real time when the control law of the electrical motor is executed on the basis of flux values stored in conjunction with the speed references during the identification phase.

BRIEF DESCRIPTION OF THE FIGURES

Other characteristics and advantages will appear in the detailed description that follows in the light of the attached drawings, in which.

DETAILED DESCRIPTION OF AT LEAST ONE EMBODIMENT

The invention described below applies to controlling an asynchronous (induction) motor, preferably with a three-phase power supply. It is implemented in a conventional control scheme of the vectorial or scalar type, in open loop, that is to say without any return of a speed measurement at the electrical motor, or in closed loop, that is to say with a return of a speed measurement at the electrical motor.

In the continuation of the description, motor voltage $U_m$ is understood to be the amplitude of the voltage reference vector having the two components $u_{d\_ref}$ and $u_{q\_ref}$. Furthermore, passing from the rotating identifier (d, q) to the three-phase identifier a, b, c, which corresponds to the physical identifier of the controlled electrical motor, is known. We therefore also have:

$$u_a = U_m \cos(\theta)$$
$$u_b = U_m \cos\left(\theta - \frac{2\pi}{3}\right)$$
$$u_c = U_m \cos\left(\theta + \frac{2\pi}{3}\right)$$

Where $u_a$, $u_b$, $u_c$ are the instantaneous values of the voltages applied to each output phase and $\theta$ is the angle of phase difference applied among voltages applied between the output phases.

The control method of the invention is implemented in a control system that includes a processing unit UC. The processing unit UC includes at least one microprocessor and a memory. This control system is associated with a variable speed drive designed to control an electrical motor. It will be able in particular to be integrated with said variable speed drive.

In a known manner, the variable speed drive includes, as a general rule;

Input phases R, S, T connected to an electrical network supplying alternating voltage.

An AC/DC rectifier 10, such as for example, a bridge of diodes designed to transform the alternating voltage supplied by the network to direct voltage.

A DC power supply bus connected at output, of the rectifier and including two power supply lines L1, L2, between which the direct voltage is applied.

At least one bus capacitor Cbus connected between the two bus power supply lines and designed to keep the direct voltage at a constant value.

A DC/AC inverter 11 connected to the DC power supply bus and comprising several power transistors, of the IGBT type for example, controlled by the processing unit so as to apply the required voltages to the output phases connected to the electrical motor. The inverter 11 is controlled for example by traditional technologies of the PWM (Pulse Width Modulation) or DTC (Direct Torque Control) type. A control law executed by the processing unit UC makes it possible to determine the voltages to apply to the output phases.

Output phases a, b, c intended to be connected to the electrical motor M to be controlled.

In a non-limitative manner, the invention will be described for a control law of the U/F scalar type in open loop. It must be understood that the method described below will be identical regardless of the control law used.

Figure 1:
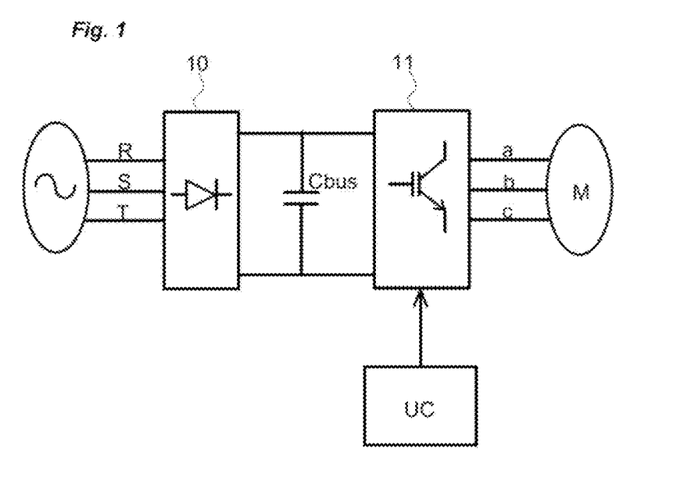
FIG. 1 shows the diagram of a conventional variable speed drive including the control system of the invention.
Figure 2:
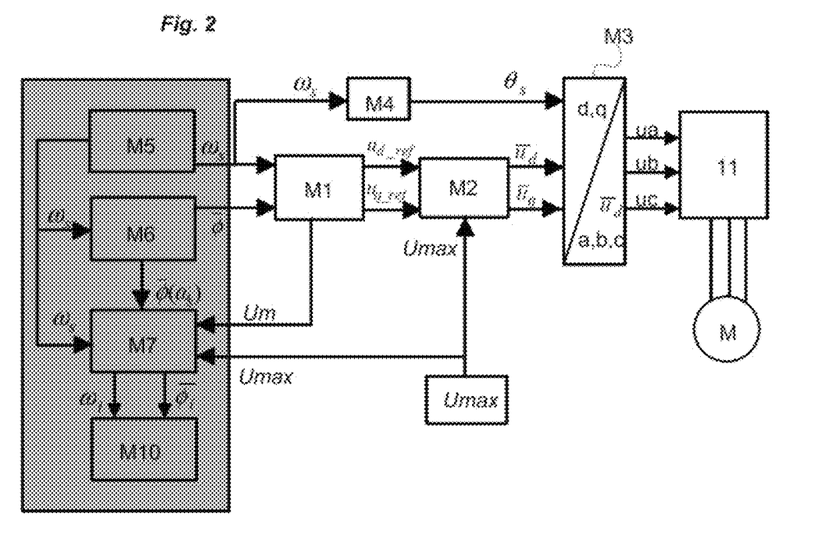
FIG. 2 shows a synoptic view illustrating the functioning principle of the control method of the invention, according to a first embodiment.
Figure 4:
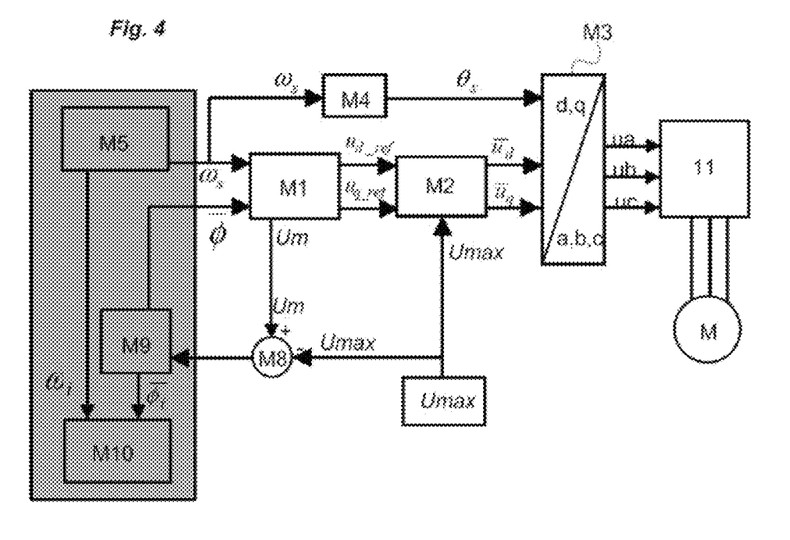
FIG. 4 shows a synoptic view illustrating the functioning principle of the control method of the invention, according to a second embodiment.

In a known manner with reference to FIGS. 2 and 4, a conventional U/f scalar control law, executed by the processing unit in order to control an asynchronous electrical motor in open loop, includes the following Main characteristics:

A speed reference that corresponds to the electrical pulsation $\omega_s$ of the currents to be injected at the stator, and a flux reference $\bar{\phi}$, are applied in input.

The processing unit UC, determines, from a voltage calculator module M1, a forward voltage reference $u_{d\_ref}$ yet and a voltage reference $u_{q\_ref}$ in phase quadrature.

From the two voltage components, the processing unit UC executes a module M2 for limiting voltage to a determined value $U_{max}$, function of the limit voltage $U_{lim}$ that the variable speed drive can supply to the electrical motor M. We will have, for example:

$$U_{max}=0.95\times U_{lim}$$

At output of the limitation module M2, a limited forward voltage reference $\bar{u}_d$ and a limited voltage reference $\bar{u}_q$ in phase quadrature are obtained, which are the basis for determining the voltages to be applied at output.

From these two voltages, a module M3 applies a Park's transformation to determine the voltages $u_a, u_b, u_c$ to be applied to each output phase.

The processing unit also executes a module M4 for determining the angle of phase difference $\theta_s$ to be applied among the voltages $u_a, u_b, u_c$ to be applied to the motor based on the pulsation $\omega_s$ introduced in input.

Other modules can, of course, be implemented by the processing unit, but these will not be described in this application.

This control law is implemented during an operating phase, that is to say during normal functioning of the electrical motor M controlled by the variable speed drive.

The invention relates to a control method that includes an identification phase, preferably conducted prior to said operating phase. This identification phase aims to determine, for different pulsations $\omega_s$ applied in input, the flux values for which the motor voltage is equal to a determined threshold value. This threshold value will preferably be linked to the limit voltage value $U_{lim}$ that the variable speed drive can supply. This threshold value, designated $U_{max}$, is chosen lower than the limit voltage value $U_{lim}$. This threshold value is preferably stored by the processing unit and, for example, is equal to:

$$U_{max}=0.95\times U_{lim}$$

During normal functioning of the electrical motor M, the identified flux values will make it possible to adjust in real time, if necessary, the value of the flux reference $\bar{\phi}$ and thus avoid a voltage limitation.

Figure 5:
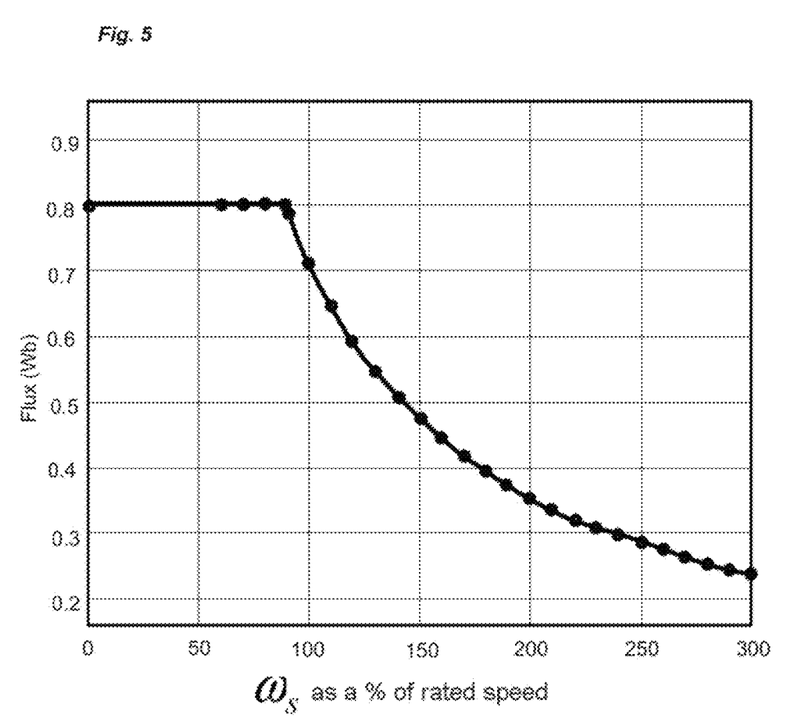
FIG. 5 shows a curve connecting the flux reference to the speed reference at a maximum voltage.

In other words, it is a question of constructing a curve profile connecting the amplitude of the flux reference at the pulsation $\omega_s$ to a determined threshold voltage, for example, equal to the threshold value defined above. Such a profile is shown in FIG. 5, in normal functioning, if the flux of the electrical motor remains at an amplitude that is situated below this curve, then the electrical motor M will not reach the voltage limitation.

The demonstration that follows makes it possible to show that a variation of the flux has an effect on the motor voltage.

The electrical equations of an asynchronous motor in the rotating identifier d,q, according to a standard model, are as follows (notation in complex form):

$$\begin{cases} \dfrac{d}{dt}\phi = -[T_r^{-1} + j(\omega_s - \omega_r)]\phi + R_{req}i_s \\ L_f\dfrac{di_s}{dt} = -(R_s + R_{req} + jL_f\omega_s)i_s + (T_r^{-1} - j\omega_r)\phi + u_s \end{cases}$$

Where:

$$R_{req} = R_r\frac{L_m^2}{L_r^2},\ T_r = \frac{L_r}{R_r},\ L_f = L_s - \frac{L_m^2}{L_r}\ et\ \Phi = \frac{L_m}{L_r}\Phi_r.$$

The Electrical Parameters are:
$R_s$: stator resistance;
$R_r$: rotor resistance;
$L_s$: stator inductance;
$L_r$: rotor inductance;
$L_m$: mutual inductance between the stator and the rotor.

The Variables are:
$\phi_r$: rotor flux.
$i_s$: stator current.
$u_s$: motor voltage.
$\omega_s$: electrical pulsation.
$\omega_r$: mechanical speed multiplied by the number of pairs of poles.

As already explained the voltage supplied by the variable speed drive to the electrical motor cannot exceed a limit value $U_{lim}$, and so the amplitude of the motor voltage is subjected to the following constraint:

$$|u_s|<U_{lim}$$

In equilibrium, the motor voltage is:

$$u_s=(R_s+jL_f\omega_s)i_s+j\omega_s\phi$$

Figure 3A:
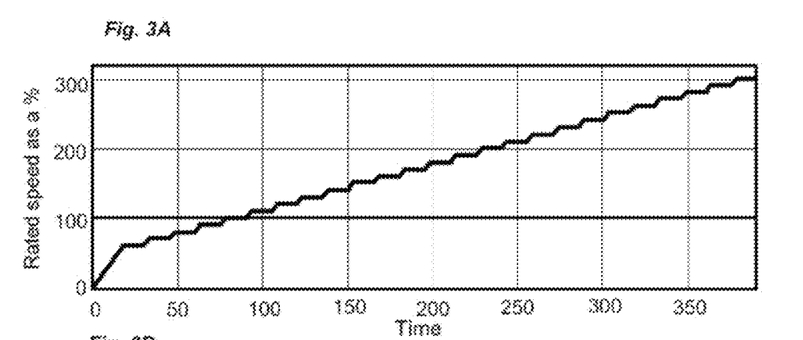
FIGS. 3A to 3D show curves illustrating the functioning principle of the invention according to the first embodiment.
Figure 3B:
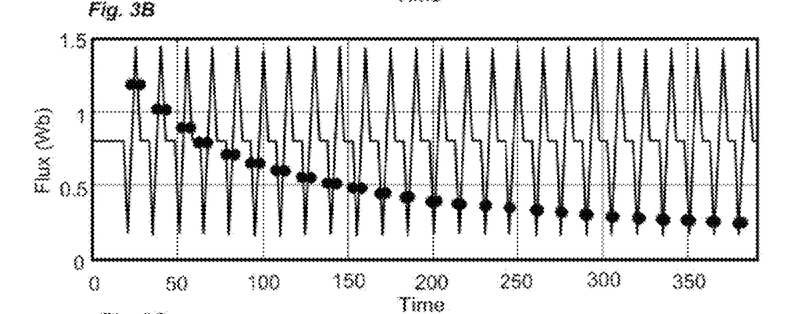
Figure 3C:
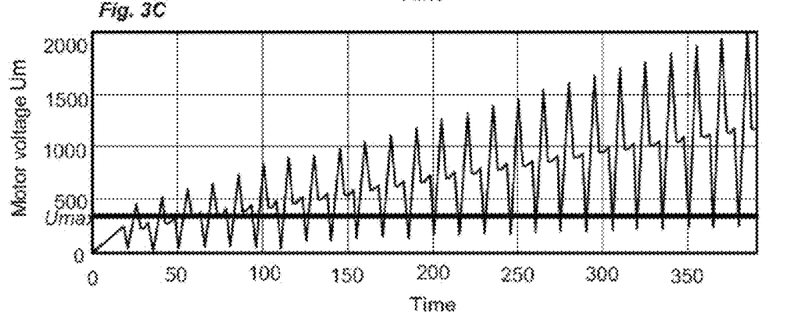
Figure 3D:
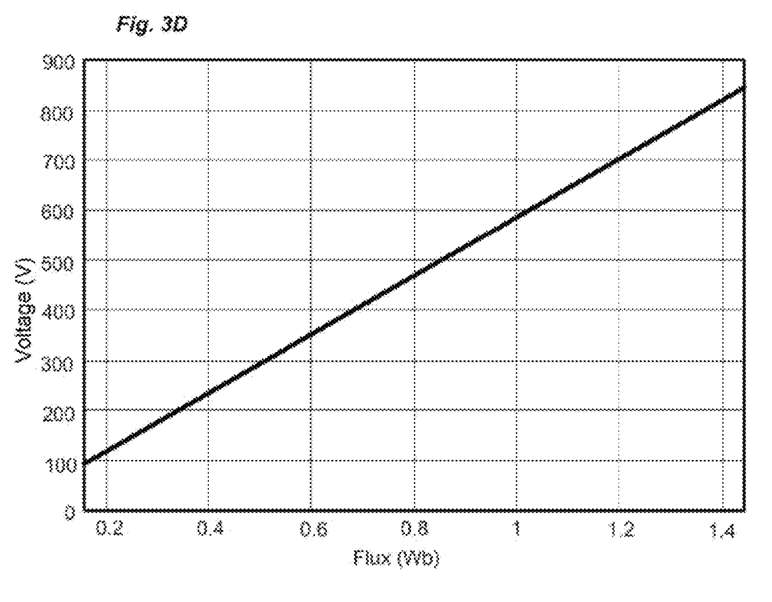

The amplitude of the motor voltage $U_m=|u_s|$ increases with the flux module $|\phi|$ or the pulsation $\omega_s$. FIG. 3D illustrates an example of the relationship between the voltage and the flux of an asynchronous motor at constant speed. From this, it is deduced that, in order to prevent the motor voltage $U_m$ from being higher than the limit voltage $U_{lim}$ with a constant speed it is sufficient to reduce the flux value.

The identification phase for the flux values can be implemented according to different embodiments. FIGS. 2 and 4 illustrate two distinct embodiments. On these two figures, the function blocks that allow the implementation of the identification phase are enclosed in the greyed area.

In these two embodiments, the identification phase consists in scanning a whole pulsation range following a pulsation trajectory. The processing unit UC executes a pulsation trajectory, module M5 in order to make the pulsation $\omega_s$ take several successive values. As shown on FIG. 3A, this is, for example, a staircase profile followed by the pulsation $\omega_s$, each step of the staircase representing a distinct value taken by the pulsation $\omega_s$, during a determined period.

For each of the values thus taken by the pulsation $\omega_s$, the processing unit UC will determine the flux value $|\phi|$ for which the motor voltage $U_m$ is equal to the predefined threshold value, that is to say, equal to the value $U_{max}$.

With reference to FIG. 2, according to the first embodiment, the processing unit implements the following steps:

For each pulsation value $\omega_s=\omega_i$ (where i is between 1 and N) that follows the pulsation trajectory generated by the module M5 applied in input, the processing unit UC executes a flux trajectory module M 6 making it possible to vary the flux reference between two extreme values, that is to say between a minimum flux value and a maximum flux value. The profile of flux variation between these two extreme values and for each speed reference value is shown on FIG. 3B. We therefore have:

$$\Phi_{min}<|\overline{\Phi}|<\Phi_{max}$$

For each pulsation value $\omega_i$ and for each value taken by the flux reference, the processing unit UC determines the motor voltage $U_m$. For this purpose, it executes the aforementioned voltage calculator module M1.

The processing unit UC thus obtains a voltage variation profile as a function of the flux reference applied in input, with constant pulsation. Such a profile is shown on FIG. 3D.

From the voltage variation profile thus obtained, the processing unit UC then determines for which flux reference value, applied in input, the motor voltage $U_m$ is equal to the defined threshold value, that is to say, to the value $U_{max}$. For this purpose, it is just a question of executing a module M7 in order to determine the intersection between the constant defined by $U_{max}$ and the voltage variation curve. FIG. 3B therefore shows, for each value taken by the pulsation $\omega_s=\omega_i$, the flux reference value for which the motor voltage is equal to the threshold value $U_{max}$. Any suitable method of determination can, of course, be envisaged.

For each speed reference value, the processing unit UC stores (M10) the flux reference value for which the motor voltage is equal to the threshold value $U_{max}$.

The processing unit implements these different steps for the N values taken by the pulsation, over the whole range, such as:

$$\omega_{min}<\omega_s<\omega_{max}$$

With reference to FIG. 4, according to the second embodiment, the processing unit UC implements the following steps:

For each pulsation value $\omega_s=\omega_i$ (where i is between 1 and N), applied as a reference, the processing unit UC applies in input a flux reference $\overline{\phi}$ fixed at a determined value (for example, arbitrarily).

As a function of the value of the pulsation $\omega_i$ and the value of the flux reference $\overline{\phi}$, both applied in input, the processing unit UC determines the motor voltage $U_m$ in the voltage calculator module M1.

The processing unit UC implements a module M8 for comparing the value of the calculated motor voltage $U_m$ and the threshold value $U_{max}$.

The difference between these two voltages is injected into a regulator M9 with integral proportional action in order to correct the flux reference value applied in input.

The regulating loop is implemented until the motor voltage $U_m$ is at a value equal to the threshold value $U_{max}$. When, equality is reached, the processing unit UC stores (M10) the corresponding flux reference value that is applied in input.

In this second embodiment, the different steps are also implemented by the processing unit for the N values taken by the speed reference over the whole range, such as:

$$\omega_{min}<\omega_s<\omega_{max}$$

On conclusion of the identification phase, implemented according to one or other of the embodiments described above, N torques of $(\omega_i, |\overline{\Phi}_i|)$ are obtained such as i=1,2,3 ... N. These values constitute a curve $|\overline{\Phi}|=f(\omega_s)$ such as that shown on FIG. 5. If the flux of the electrical motor is below this curve, then the electrical motor does not reach the voltage limitation.

At the end of the identification phase, the values obtained of $(\omega_i, |\overline{\Phi}_i|)$ where i=1,2,3 ... N are stored in the memory of the processing unit UC. These values are intended to be used when the motor is functioning, during the operating phase, in order to adjust the flux value in real time as a function of the pulsation requested in input, in order to avoid voltage limitation.

During normal functioning, the flux profile can be implemented in different forms:

From a stored table. The N torques of $(\omega_i, |\overline{\Phi}_i|)$ can be stored in the form of a table to which the processing unit UC refers in order to verify that the torque, which includes the speed reference and the flux reference, both applied in input, is situated well below the determined profile and in order to adjust in real time the value of the flux reference to the stored value if the requested pulsation $\omega_s$ exceeds a certain threshold.

From a rational parametric function where the parameters of this function are estimated from points already identified (by interpolation). In view of the profile of the curve shown on FIG. 5, the interpolation is conducted for example from a hyperbola, such as defined by the following expression:

$$|\overline{\Phi}| = \begin{cases} \dfrac{\Phi_n}{\alpha\left(\left|\dfrac{\omega_s}{\omega_n}\right|-x_0\right)+1} & \text{if } \left|\dfrac{\omega_s}{\omega_n}\right| > x_0 \\ \Phi_n & \text{if } \left|\dfrac{\omega_s}{\omega_n}\right| \le x_0 \end{cases}$$

In which:
$\Phi_n$ is the rated flux.
$\omega_n$ is the rated pulsation.
$\alpha$ and $x_o$ are constants and are interpolated from data from the curve of FIG. 5.

The method described above will be valid regardless of the control law used, this method consisting in a general manner in forming N torques of $(\omega_i, |\overline{\Phi}_i|)$ such as i=1,2,3 ... N for which the motor voltage is equal to the threshold value defined by $U_{max}$.

The solution of the invention thus offers many advantages, listed below:

It is easy to implement as it does not require additional means.

It can be implemented for controlling an asynchronous electrical motor, regardless of the type of control applied to this motor.

It is reliable and makes it possible with certainty to avoid functioning with voltage limitation in the event of flux reduction and hence to avoid transient dynamic disturbances of the mechanical values of the motor that could result therefrom.

The invention claimed is:

1. A method for controlling an asynchronous electrical motor, implemented in a processing unit, said processing unit being associated with a power converter connected by output phases to said electrical motor and disposed to execute a control law for the purpose of determining voltages to be applied to said electrical motor based on a speed reference and a flux reference applied in input, comprising an identification phase, said method comprising:
- generating a speed trajectory in input of the control law in order to make the speed reference take several determined successive values,
- for each value taken by the speed reference, determining the voltage at the terminals of the electrical motor,
- for each value taken by the speed reference, determining and storing the flux value for which the voltage at the terminals of the electrical motor is equal to a determined threshold value.

2. The control method according to claim 1, wherein the speed trajectory follows a profile as a staircase, each step of which corresponds to a distinct value to be applied.

3. The control method according to claim 1, wherein for each value taken by the speed reference, said method comprises:
- making the flux reference vary between a minimum value and a maximum value,
- determining the curve of variation of the motor voltage obtained when the flux reference varies,
- determining the flux reference value for which the motor voltage is equal to said threshold value.

4. The control method according to claim 3, wherein the intersection between the constant formed by said threshold value and the curve of variation of the motor voltage obtained when the flux reference varies at a given speed reference.

5. The control method according to claim 1, wherein for each value taken by the speed reference, said method comprises:
- fixing the flux reference at a determined value,
- determining the motor voltage obtained as a function of said speed reference value and said flux reference, both applied in input,
- determining the voltage difference between the motor voltage obtained and said threshold value,
- correcting the flux reference value applied in input until the motor voltage is equal to said threshold value,
- storing the flux reference value obtained when the motor voltage is equal to said threshold value.

6. The system according to claim 5, wherein for each value taken by the speed reference, said system fixes the flux reference at a determined value and comprises:
- a module for determining the motor voltage obtained as a function of said speed reference value and said flux reference value, both applied in input,
- a module for determining the voltage difference between the motor voltage obtained and said threshold value,
- a module for determining a correction to be applied to the flux reference value applied in input until the motor voltage is equal to said threshold value,
- a module for storing the flux reference value obtained when the motor voltage is equal to said threshold value.

7. The control method according to claim 1, comprising an operating phase that follows the identification phase and wherein each flux value stored in conjunction with each speed reference during the identification phase can be used to adjust the flux in real time when the control law of the electrical motor is executed.

8. A control system for an electrical motor comprising a processing unit, said processing unit being associated with a power converter connected by output phases to said electrical motor and disposed to apply variable voltages to said electrical motor while executing a control law, wherein, during an identification phase, said system comprising:
- a module for generating a speed trajectory in input of the control law so as to make the speed reference take several determined successive values,
- for each value taken by the speed reference, a module for determining the voltage at the terminals of the electrical motor,
- for each value taken by the speed reference, a module for determining the flux value for which the voltage at the terminals of the electrical motor is equal to a determined threshold value, and a module for storing said determined flux value.

9. A system according to claim 8, wherein the speed trajectory generated by the module for generating a trajectory follows a profile as a staircase, each step of which corresponds to a distinct value to be applied.

10. A system according to claim 8, wherein for each value taken by the speed reference, said system comprises:
- a module for generating a flux reference trajectory between a minimum value and a maximum value,
- a module for determining a curve of variation of the motor voltage when the flux reference varies,
- a module for determining the flux reference value for which the motor voltage is equal to said threshold value.

11. The system according to claim 10, wherein said module for determining the flux reference value is disposed to determine the intersection between the constant formed by said threshold value and the curve of variation of the motor voltage obtained when the flux reference varies at a given speed reference.

12. The system according to claim 8, wherein during an operating phase that follows the identification phase, said system is disposed to adjust the flux in real time when the control law of the electrical motor is executed on the basis of flux values stored in conjunction with the speed references during the identification phase.

* * * * *